United States Patent [19]

Penney et al.

[11] Patent Number: 4,724,302

[45] Date of Patent: Feb. 9, 1988

[54] BEAD PROCESS CONTROL WITH PROFILER

[75] Inventors: Carl M. Penney, Schenectady; Michael H. McLaughlin, Scotia, both of N.Y.

[73] Assignee: General Electric Company, Schenectady, N.Y.

[21] Appl. No.: 31,300

[22] Filed: Mar. 30, 1987

[51] Int. Cl.$^4$ .............................................. B23K 9/12
[52] U.S. Cl. ............................ 219/130.21; 156/350; 156/360; 219/137.71; 901/41; 901/42
[58] Field of Search ............... 219/124.34, 137.71, 219/130.21, 130.01, 124.5; 901/42, 41; 156/350, 351, 356, 360, 378

[56] References Cited

U.S. PATENT DOCUMENTS

| | | | |
|---|---|---|---|
| 3,370,151 | 2/1968 | Normando | 219/130.21 |
| 3,612,818 | 10/1971 | Bechtle et al. | 219/137.71 |
| 4,093,844 | 6/1978 | Fellure et al. | 219/137.71 |
| 4,168,430 | 9/1979 | Denis et al. | 250/338 |
| 4,219,720 | 8/1980 | Moench | 219/124.34 |
| 4,225,771 | 9/1980 | Justice et al. | 219/130.01 |
| 4,409,478 | 10/1983 | Libby | 250/560 |
| 4,413,180 | 11/1983 | Libby | 250/236 |
| 4,493,968 | 1/1985 | Brown | 219/124.34 |
| 4,532,408 | 7/1985 | Richardson | 219/130.01 |
| 4,567,347 | 1/1986 | Ito et al. | 219/124.34 |
| 4,578,561 | 3/1986 | Corby, Jr. et al. | 219/124.34 |
| 4,616,121 | 10/1986 | Clocksin et al. | 901/42 |

FOREIGN PATENT DOCUMENTS

| | | | |
|---|---|---|---|
| 0153531 | 1/1982 | German Democratic Rep. | 219/124.34 |
| 57-73605 | 5/1982 | Japan | 219/124.34 |

OTHER PUBLICATIONS

*Welding Design & Fabrication*, Nov. 1984, pp. 45–48, "Laser Vision Robot Guides Welding Arc", Scholer Bangs.

*Automatix Product Bulletin*, "Autovision® 4 High Speed Vision System for Inspection or Robot Guidance".

*Primary Examiner*—Clifford C. Shaw
*Attorney, Agent, or Firm*—Donald R. Campbell; James C. Davis, Jr.; Paul R. Webb, II

[57] ABSTRACT

Feed process control is accomplished using an optical profiler to determine the height, width, and cross sectional area of a bead produced by a bead producing tool. Feedback control of the height, width, and/or area is obtained by modifying various parameters of the bead producing tool. If the bead producing tool is a welding torch, the parameters may include the weld torch voltage, weld torch current, wire feed rate, and the speed of travel of the torch across the workpiece or workpieces. If the bead producing tool is a sealant or glue gun, the parameters may include the pressure of the sealant or the glue supplied to the sealant or the glue gun, the size of an adjustable nozzle orifice of the sealant or the glue gun, and the speed of travel of the sealant or the glue gun along the surface of the workpiece.

8 Claims, 10 Drawing Figures

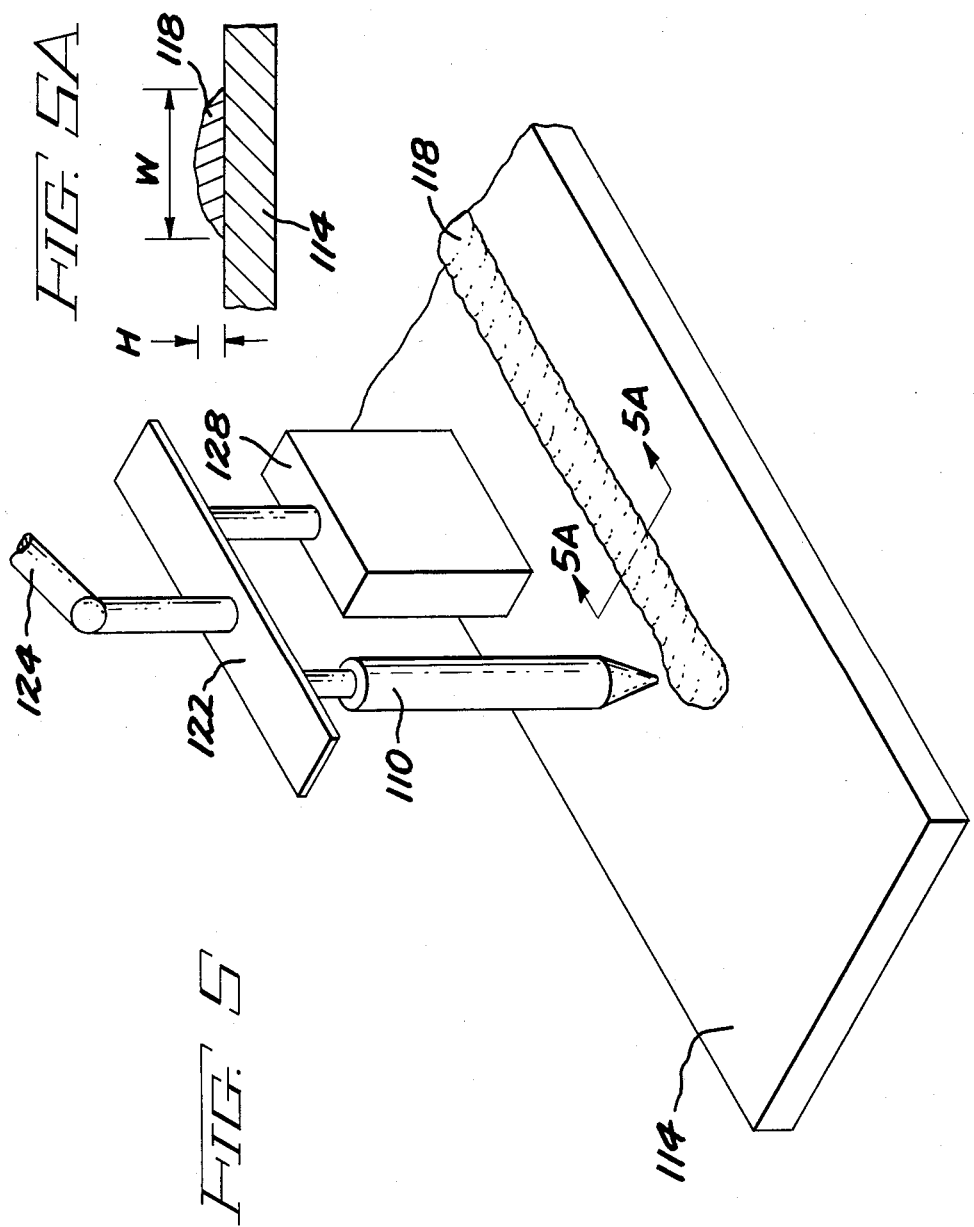

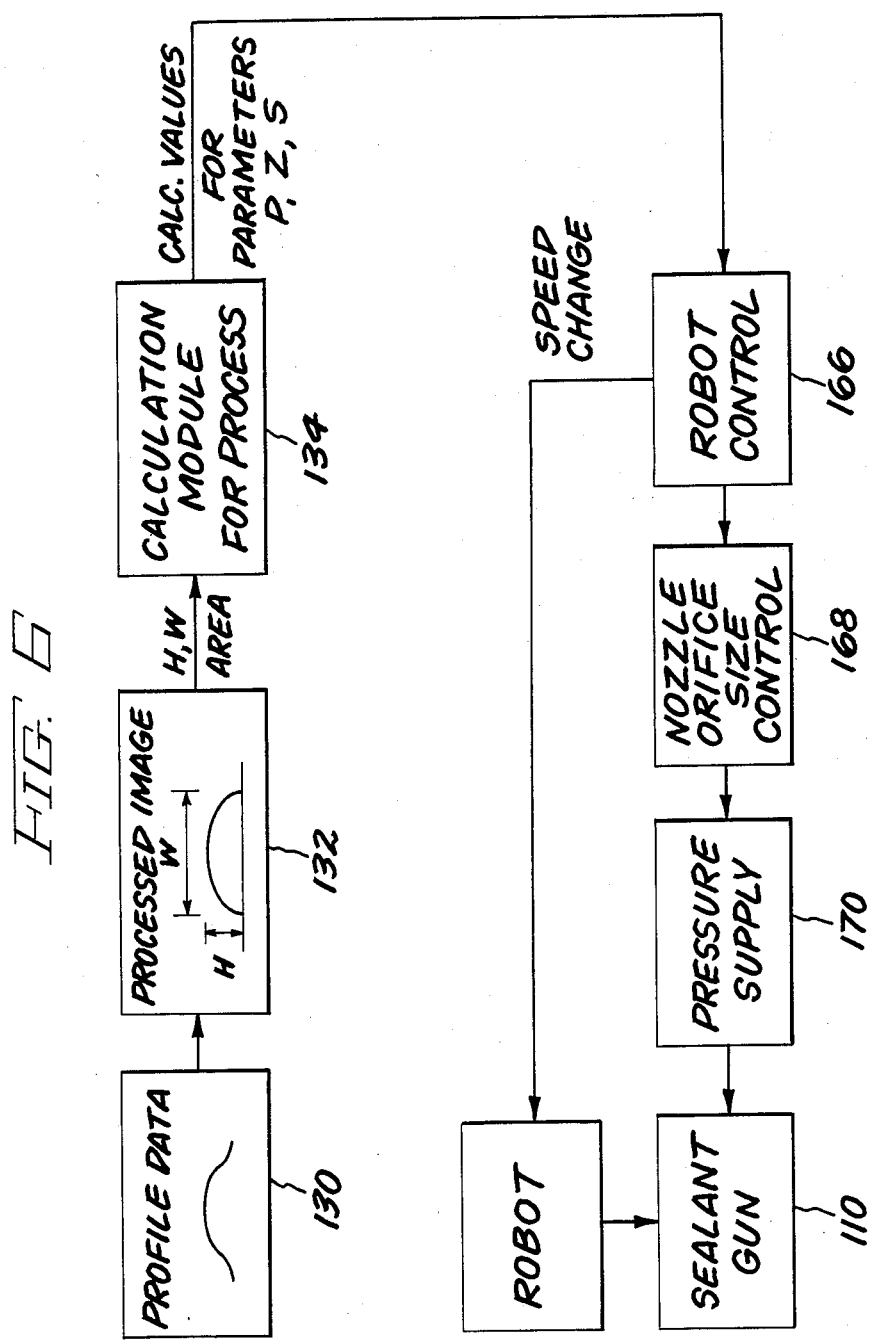

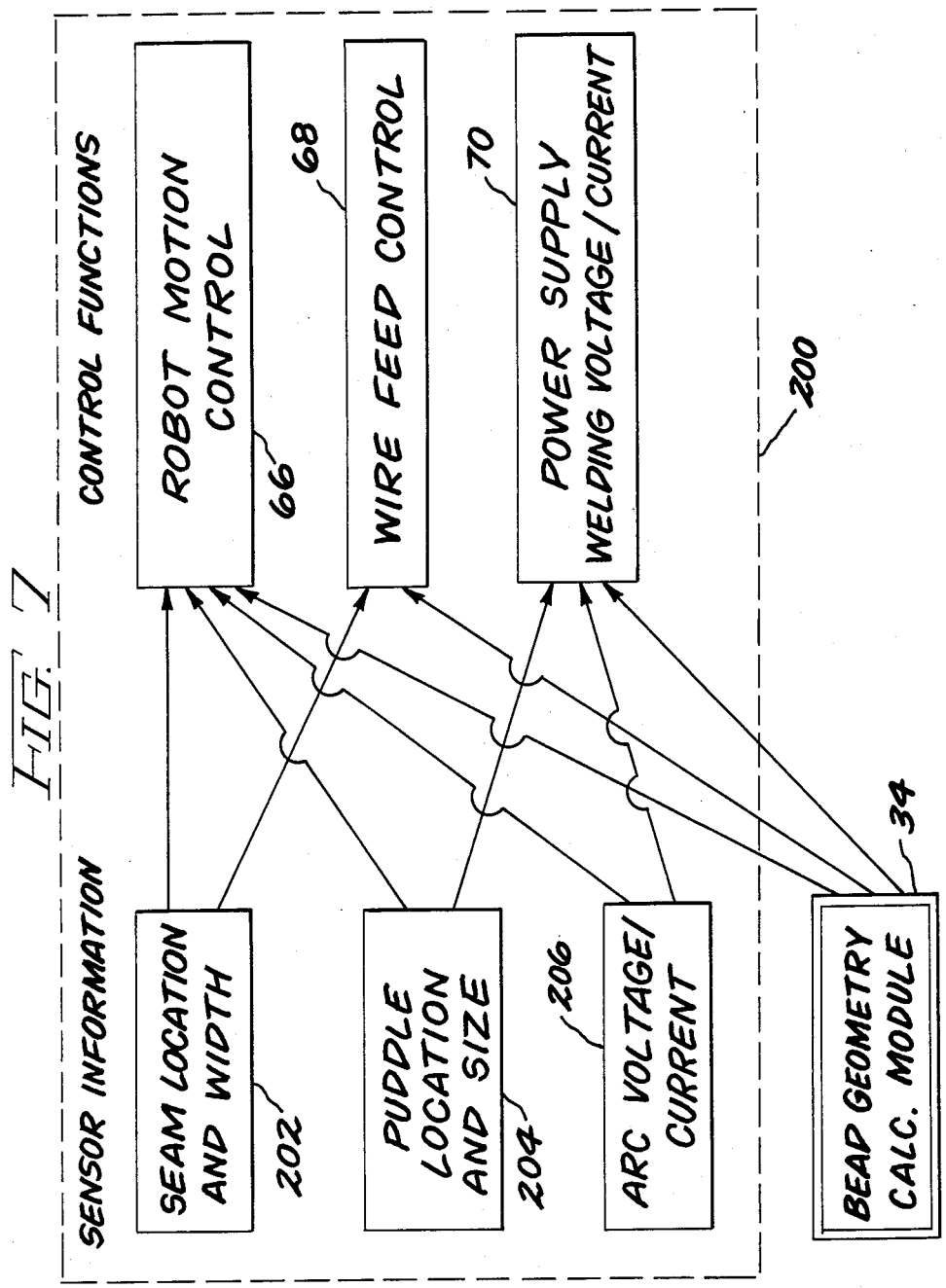

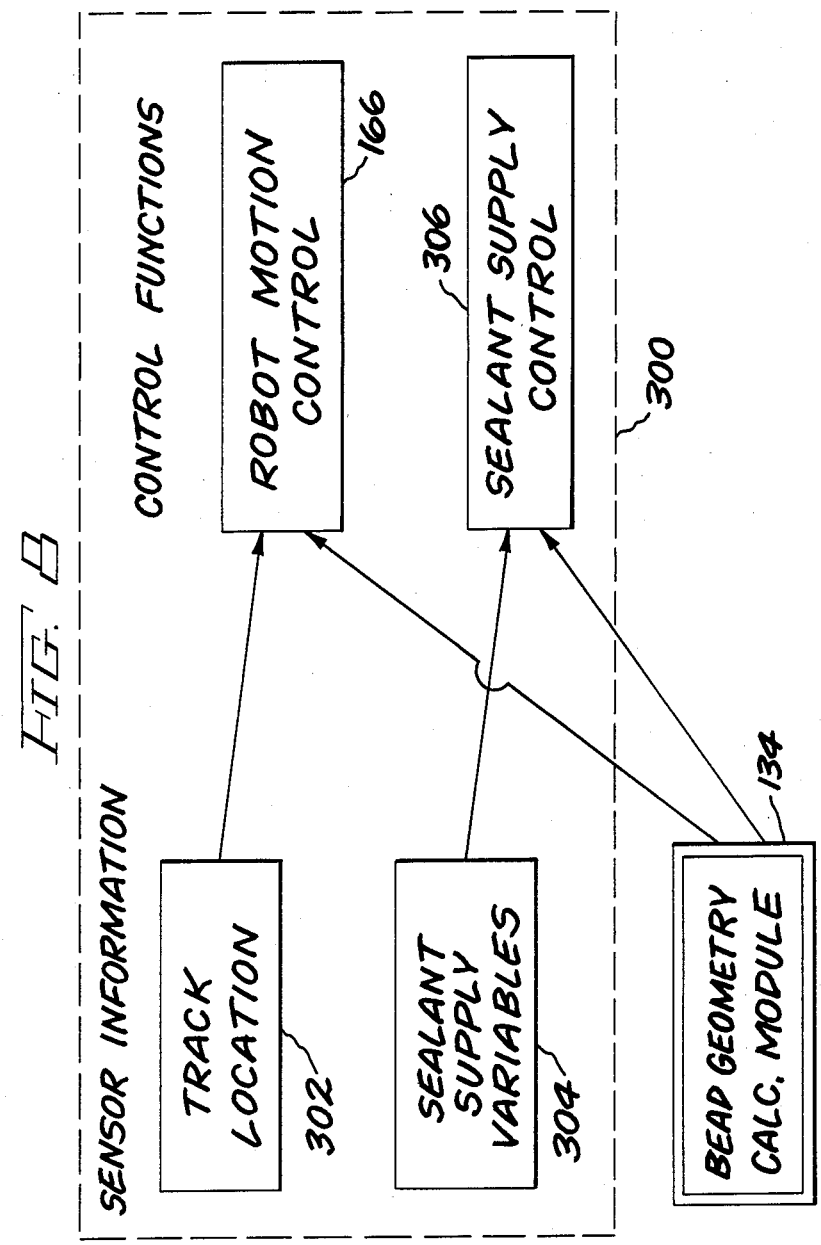

BEAD PROCESS CONTROL WITH PROFILER

BACKGROUND OF THE INVENTION

This invention relates to bead process control. More specifically, this invention relates to a method and system for bead process control using a profiler.

When performing an automated welding process it is important to maintain certain bead dimensions within specified ranges in order to achieve the proper weld strength. Variations in weld bead geometry can result from uncertainties in the wire feed rate, varying surface conditions on workpieces, variations in wire feed compositions, and other factors. These variations in weld bead geometry and the resulting diminished weld strength are a significant problem in the automation of welding process.

Although various feedback control systems have previously been used to try to control automated welding processes, such previous feedback control systems have been subject to one or more of several disadvantages. For example, some prior art systems have used sensors directed towards the molten weld pool. Although knowledge about the weld pool is useful, it is not usually sufficient to determine some important variables of the bead which results after hardening of the weld pool. Other prior art arrangements have used infrared or visible radiation detectors for sensing temperature gradients of a newly-laid bead in order to determine the width of the weld bead. Like numerous other processes, this radiation detection process does not detect the bead height or the bead cross sectional area, both of which may be significant bead dimensions in providing for full design weld strength. Additionally, this latter radiation detection method is very sensitive to errors in its calculated bead width because variations in surface conditions may significantly affect apparent temperature gradients.

The application of weld metal, sealant or glue to a workpiece requires one to maintain certain bead dimensions. Variations in weld bead geometry can result from uncertainties in wire feed rate, varying surface conditions on workpiece or variations in feed wire composition. Factors such as variations in sealant or glue supply pressure and nozzle condition can affect the size of the bead which is laid down. If the bead which is laid down in too small, the sealant may not properly seal. On the other had, too large a bead is a waste of sealant or glue and may also hinder the use of the workpiece. Accordingly, too much variation in the size of the bead is quite undesirable.

OBJECTS OF THE INVENTION

Accordingly, it is a primary object of the present invention to provide a new and improved bead process control method and system.

A more specific object of the present invention is to provide bead process control which is highly accurate in sensing certain bead dimensions.

Another object of the present invention is to proivde bead process control which is quite accurate at maintaining certain bead dimensions.

A still further object of the present invention is to provide bead process control for a welding torch.

A still further object of the present invention is to provide bead process control for application of sealant or glue.

SUMMARY OF THE INVENTION

The above and other objects of the present invention which will become more apparent as the description proceeds are realized by a method of automatically controlling a bead producing process in real time comprising the steps of: producing a bead by moving a bead producing tool along the surface of one or more workpieces; generating dimensional profile information on the bead immediately after its formation including at least a first bead variable selected from the group of: the height of the bead, and the cross sectional area of the bead above the level of the workpiece; comparing the first bead variable with a first reference value and generating a first error signal; and controlling the bead producing tool for feedback control of the first bead variable. The profile information is generated by a profiler, such as an optical profiler, tracking the bead produced by the bead producing tool. The profile information includes a second bead variable selected from the group of: the height of the bead, the width of the bead, and the cross sectional area of the bead above the level of the workpiece. The method further comprises the steps of comparing the second bead variable with a second reference value and generating a second error signal, and controlling the bead producing tool for feedback control of the second bead variable. The controlling step includes changing the speed of travel of the bead producing tool for feedback control of at least one of the first and second bead variables.

The bead producing tool may be a welding torch. The controlling step includes changing a parameter selected from the group of the welding torch voltage and the welding torch current for feedback control of at least one of the first and second bead variables. The controlling step may also include changing a wire feed rate to the welding torch for feedback control of at least one of the first and second bead variables.

Alternately, the bead producing tool may be a sealant or glue gun. The controlling step may include changing the pressure on the sealant or the glue provided to the sealant or glue gun for feedback control of at least one of the first and second speed variables. The controlling step may also include changing a nozzle orifice size of the sealant or glue gun for feedback control of at least one of the first and second bead variables.

The system for controlling bead production according to the present invention comprises: a bead producing tool operable to produce a bead upon one or more workpieces; an optical profiler operable to track the bead immediately after the bead producing tool and generate profile information including at least a first bead variable selected from the group of: the height of the bead, the width of the bead, and the cross sectional area of the bead above the level of the workpiece; a calculation means operable to compare the first bead variable with a first reference value and generate a first error signal; and control means responsive to the calculation means and operable to control the bead producing tool for feedback control of the first bead variable. The profile information includes a second bead variable selected from the group of: the height of the bead, the width of the bead, and the cross sectional area of the bead above the level of the workpiece. The calculation means is further operable to compare the second bead variable with a second reference value and generate a second error signal. The control means controls the bead producing tool for feedback control of the second bead variable.

The bead producing tool used in the method may be a welding torch. The first bead variable is the width of the bead and the second bead variable is the cross sectional area of the bead. The control means is operable to change a parameter selected from the group of the welding torch voltage and the welding torch current for feedback control of the first bead parameter. The control means is operable to change a wire feed rate of the welding torch for feedback control of the second parameter.

The method may alternately use a sealant or glue gun as the bead producing tool. The control means is operable to change the pressure on the sealant or glue provided to the sealant or glue gun for feedback control of the first bead variable. The control means is operable to change a nozzle orifice size of the sealant or glue gun for feedback control of the first bead variable. The first bead variable is the height of the bead and the second variable is the cross sectional area of the bead above the level of the workpiece.

BRIEF DESCRIPTION OF THE DRAWINGS

The above and other features of the present invention which will be more apparent when the following detailed description of a preferred embodiment is considered in conjunction with the accompanying drawings wherein like characters represent like parts throughout and in which:

FIG. 1A shows a cross section view taken along lines 1A of FIG. 1.

FIG. 5 shows a sealant or glue gun in operation according to the present invention.

FIG. 5A shows a cross section view taken along lines 5A of FIG. 5.

FIG. 6 is a block diagram showing the feedback control arrangement for the sealant or glue gun of FIG. 5.

FIG. 7 is a block diagram indicating how the weld process control of the present invention could be combined with other weld process control arrangements.

FIG. 8 is a block diagram illustrating how the sealant or glue gun process control of the present invention could be combined with other sealant or glue gun control procedures.

DETAILED DESCRIPTION OF THE INVENTION

Figure 1:
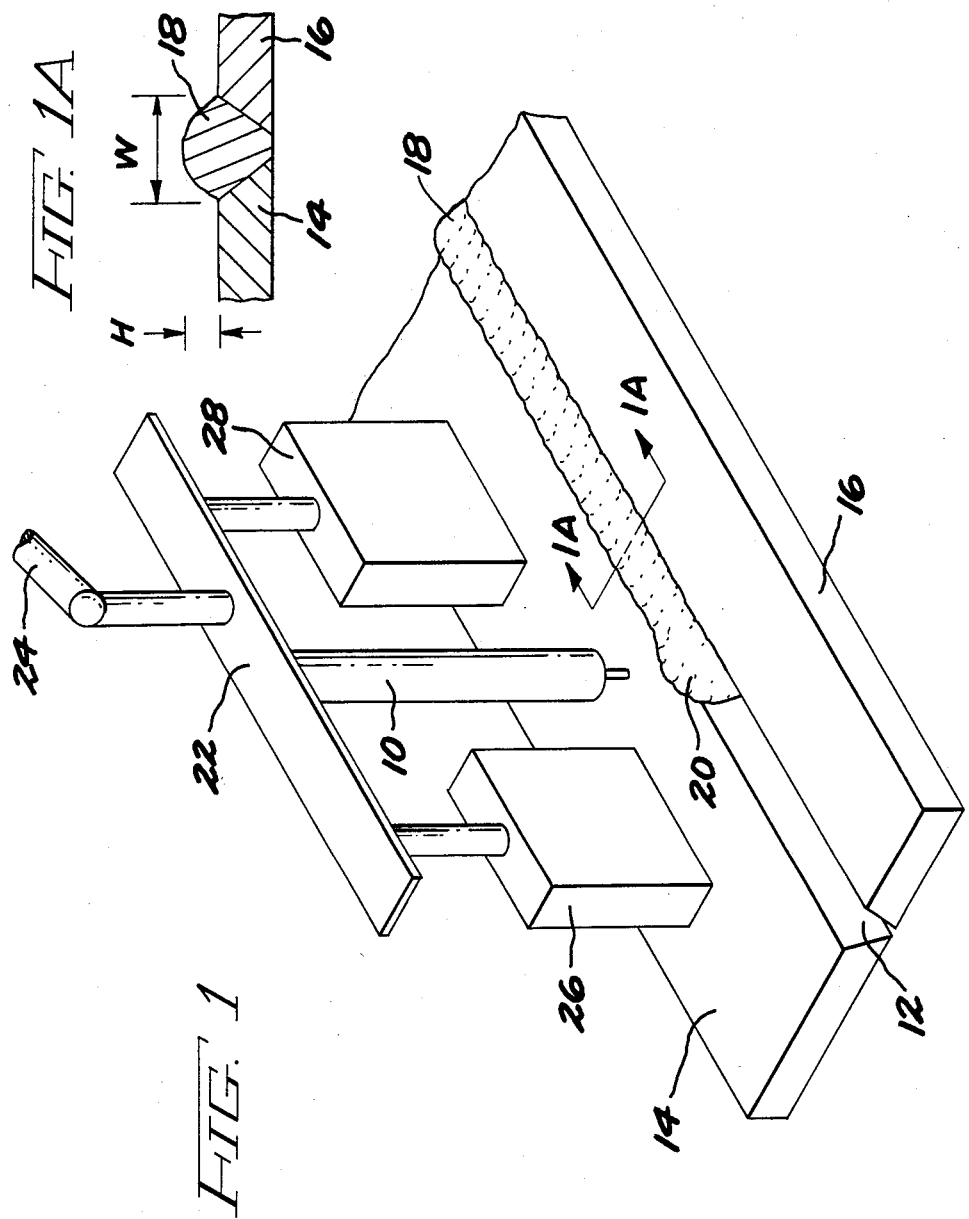
FIG. 1 shows a weld torch in operation in accord with the present invention.

The weld torch 10 is shown in FIG. 1 proceeding along seam 12 between workpieces 14 and 16 so as to lay a weld bead 18. The weld bead 18 results from the hardening of the molten weld puddle 20 which is disposed directly below the torch 10.

The torch 10 is mounted upon a support 22 moved by a robotic arm 24. The arm 24 may be connected to a robot or other automated machine (not shown) for automated control of the weld torch 10.

Also mounted upon the support 22 are a tracking profiler 26 and a bead profiler 28. The tracking profiler 26 is ussued to insure that the weld torch 10 tracks the seam 12 in a manner which need not be described in detail as this feature is not central to the present invention. More importantly, the profiler 28 is used to generate profile information on the bead 18 immediately after its formation, the bead profiler 28 closely following the path of the weld torch 10. The profiler 28 is an optical profiler which senses the height of the upper surface of the bead 18 together with the upper surfaces of the workpieces immediately adjacent thereto. (As used herein, a "profiler" is a sensor which generates data on the profile of a workpiece including the hills, dips, and other topographical features.) The profiler 28 senses the upper surface in a line pependicular to the lengthwise direction of the seam 18 to generate an image corresponding to the upper surface shown in FIG. 1A, which figure illustrates how the bead 18 is disposed between workpieces 16 and 18. The profiler 28 will be used to determine the height, width, and cross sectional area of the bead 18 as will be described below.

The profilers 26 and 28 are optical profilers which should be of the form described and claimed in U.S. Pat. No. 4,645,917 by Penney et al., entitled "SWEPT APERTURE FLYING SPOT PROFILER", assigned to the assignee of the present application and hereby incorporated by reference. By using an otpical profiler which images the bead 18 according to its height (i.e., distance between the workpiece 28 and the upper surface of bead 18) one can obtain a quite accurate image of the topography of the bead independent of temperature or other factors which could lead some sensing systems to inaccurate measurements.

As will be readily appreciated, the profilers 26 and 28 would be mounted with degrees of freedom relative to torch 10 if the torch 10 will be following a seam which is not a straight line seam. For example, if the torch 10 is to follow a seam in a right angle, the profilers 26 and 28 would be provided with some degrees of freedom relative to the torch 10 so that they may properly operate when a seam has such a right angle.

Figure 2:
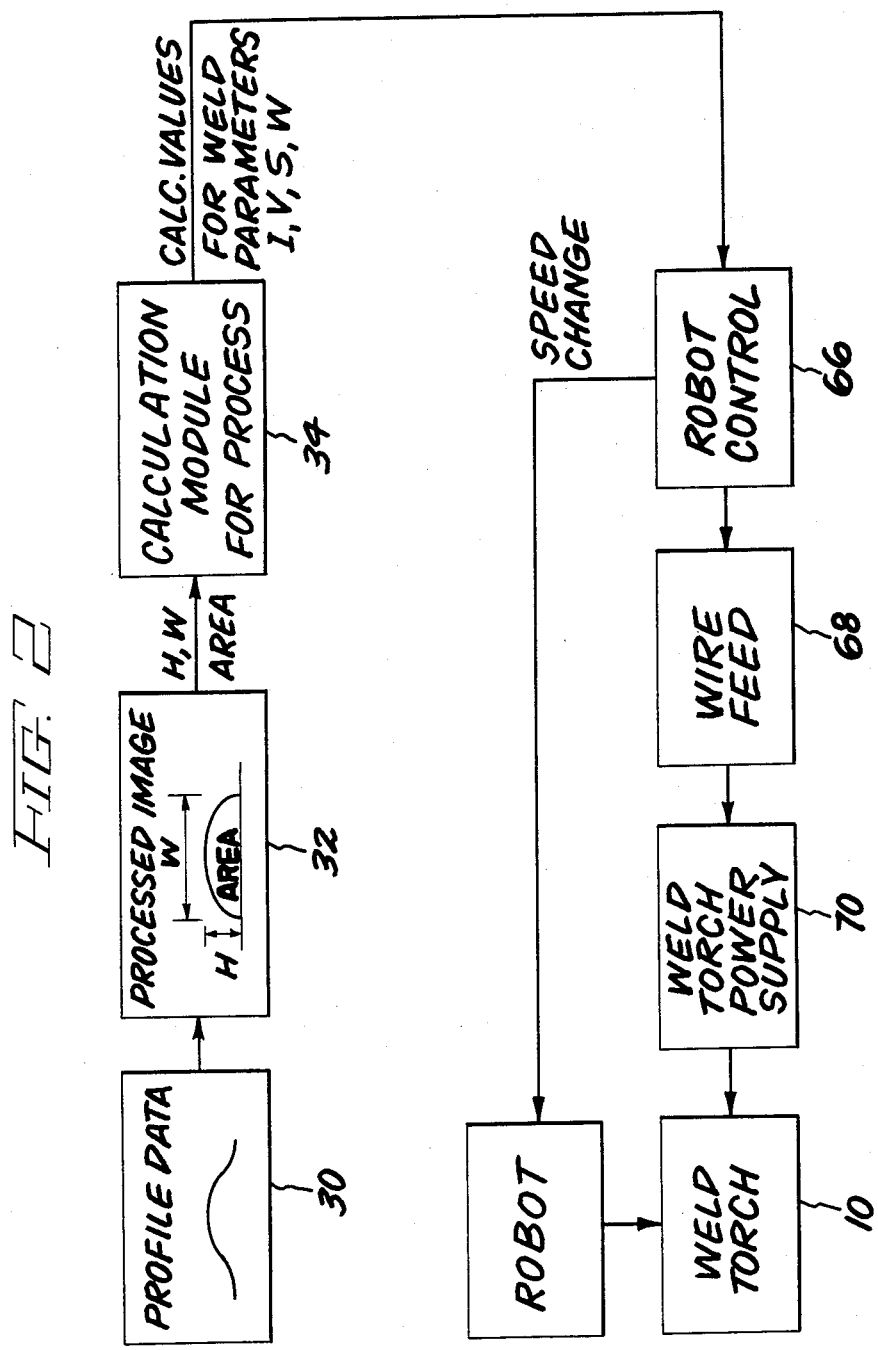
FIG. 2 is a block diagram illustrating the arrangement used for feedback control of the torch of FIG. 1.

As shown in the block diagram of FIG. 2, the profiler image information in block 30 is supplied to a processor 32 which determines the height H, width W, and cross sectional area (taken parallel to lines 1A of FIG. 1) of the weld bead 18. Known processes or arrangement for deriving the height, width, and area from a profiler image may be used. The processor 32 supplies the height H, width W, and area to a calculation module 34. The calculation model 34, which could be realized by use of a microprocessor, compares the input bead variables H, W, and the area to corresponding ranges respectively for the height, width, and area. The calculation module 34 calculates values of weld parameters such as the weld torch current I (for metal inert gas welding), welding torch voltage V (for tungsten inert gas welding), speed S of travel of the welding torch 10 along the seam 12, and/or wire feed rate W (for those weld torches having a wire feed).

The calculation module 34 calculates values for the weld parameters in order to compensate for any deviation of the bead variables H, W, and area from their proper values.

Figure 3:
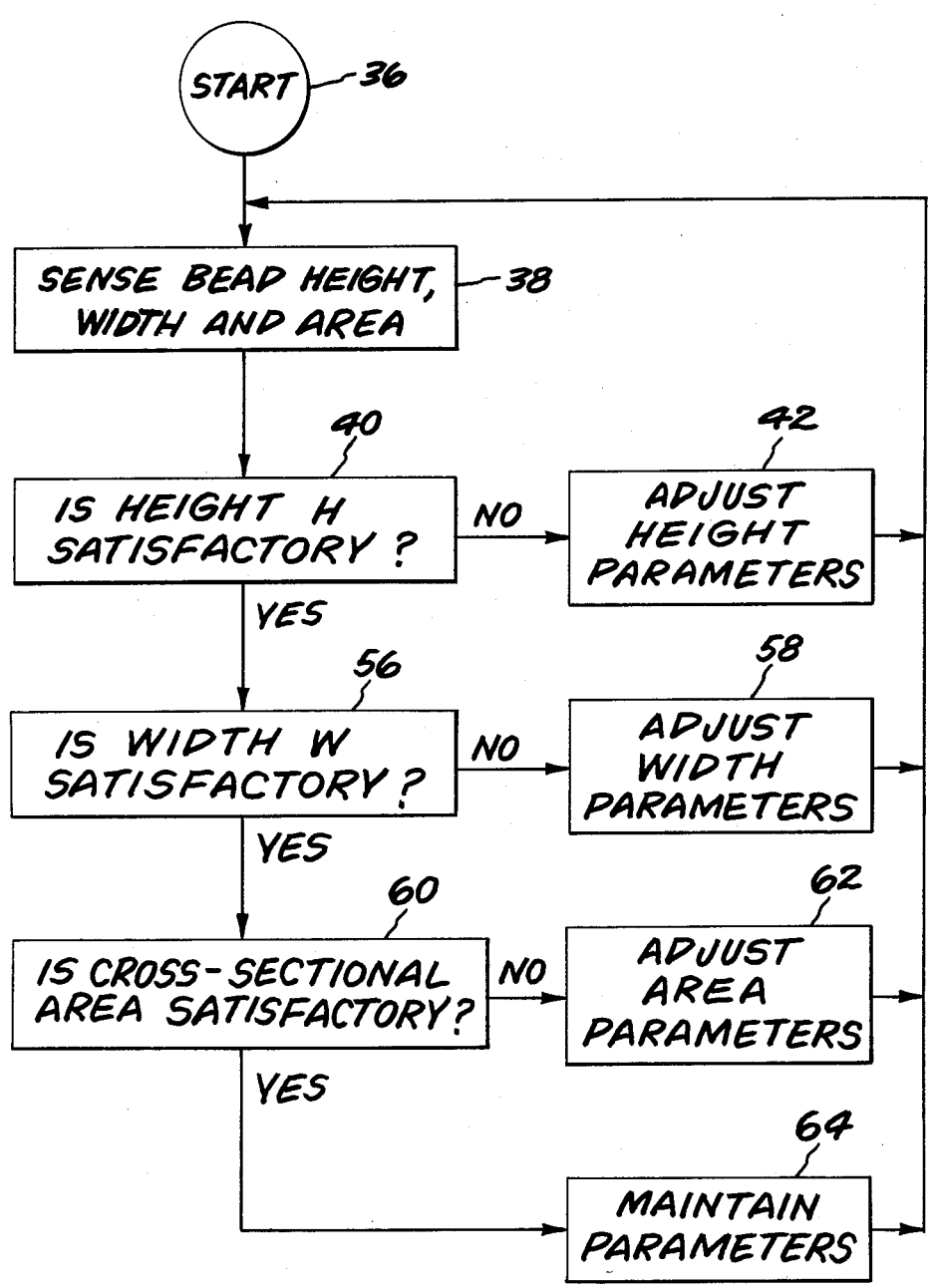
FIG. 3 is a simplified flow chart illustrating a control procedure according to the present invention.

Continuing to consider FIG. 2 but also viewing the flow chart of FIG. 3, the calculation module 34 has a start 36 which leads to block 38 wherein the bead height, width, and area are sensed. At block 40 the height H is checked to determine if it is satisfactory. Block 40 may involve comparing the sensed height to a nominal height and determining if the difference is over a tolerance value. For example, if the nominal or desired height is 5 millimeters and the tolerance is ±1 millimeter, the height would be considered unsatisfactory if it was over 6 millimeters or under 4 millimeters. The block 40 may simply involve taking the difference between the sensed value for the height and the nominal value of 5 millimeters and then determining if the difference is above the tolerance of 1 millimeter. (Alternately, the tolerance could of course be expressed as a percentage of the nominal value.) As an alternative to comparing the actual height H to a single reference value nominal height, the height H could be compared to an upper limit and compared to a lower limit, the limits defining the range of acceptable values.

If block 40 determines that the height is unsatisfactory, the control is transferred to block 42 which serves to adjust one or more of the parameters of the welding which may affect the height of the bead. Referring back to the example where 5 millimeters is the nominal value of the height and the range of acceptable height values is between 4 millimeters and 6 millimeters, a sensed value of 6.5 millimeters in height would require that the block 42 adjust height-affecting parameters. For example, too high of a bead height might be compensated for by increasing current to the weld torch (for metal inert gas welding), increasing the voltage to the weld torch (for tungsten inert gas welding), lowering the wire feed rate, and/or increasing the travel speed of the weld torch 10 along the seam 12.

Figure 4:
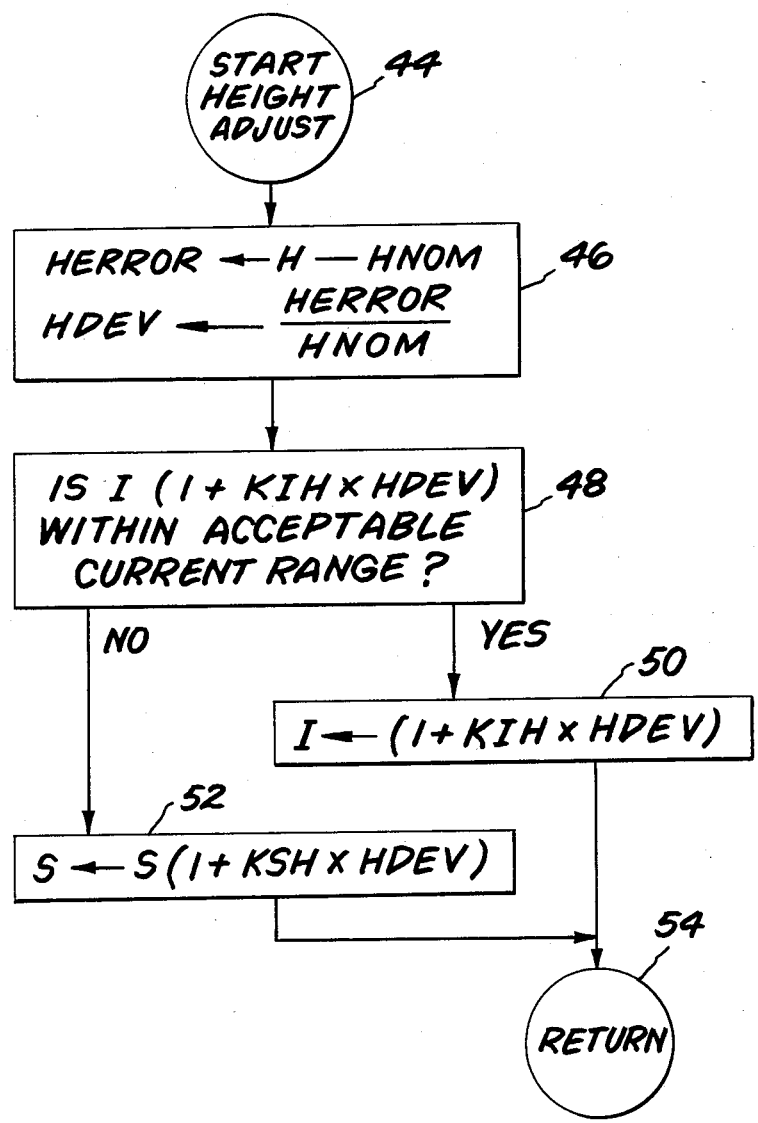
FIG. 4 shows a simplified flow chart of a height adjust subroutine which could be used with the procedure of FIG. 3.

Viewing FIG. 4 in conjunction with FIG. 3, FIG. 4 shows a height adjustment subroutine which may be used as all or part of the block 42 of FIG. 3. The height adjust subroutine of FIG. 4 includes a start block 44 which leads to block 46 whereat a height error signal HERROR is set to the difference between the sensed height H and the nominal or preferred height HNOM. (The height error signal could alternately have been calculated in block 40 and simply provided to the subroutine of FIG. 4.) The block 46 calculates a height deviation HDEV as the height error signal divided by the nominal value of the height. Referring back to the above example where the actual height is 6.5 millimeters and the nominal value is 5 millimeters, the error signal would be 1.5 millimeters and the HDEV would be equal to 0.3 corresponding to the actual height being 30% above the nominal height. The block 48 tests to determine if a proposed new current value is within an acceptable current range. The block 48 multiples the present current I by a factor dependent on the height deviation value multiplied by a value KIH. The value KIH is representative of the relationship between a change in current and the resulting change in bead height. This value KIH would be empirically determined so as to allow modification of the current to make the bead height at or close to its nominal value. For example, if it was empirically determined that one may correct for a 30% or 0.3 value of HDEV by increasing the current by 15%, the value of KIH would be 0.5. (The change in current of 15% divided by the corresponding change in height by 30% is equal to 0.5).

If an increase of 15% in current is possible without exceeding the current acceptable to the torch 10 or the current which can be produced by its power supply, the block 48 leads to block 50 which then sets the current at a value 15% higher than its previous value for the given example. The current is increased (the plus sign in front of KIH in block 50) because an increase in current corresponds to a decrease in height. If an adjustment was being performed upon a weld parameter which would be decreased to decrease the height (such as the wire feed rate W), the sign in front of the coefficient corresponding to KIH would be negative. That is, the sign would be negative because a decrease in the wire feed rate would decrease the bead height.

As shown in FIG. 4, the block 48 transfers control to block 52 if the proposed new current value of block 48 is not within an acceptable range. Block 52 increases the speed of travel of the torch 10 by replacing the current speed S of the torch with a speed increase by the product of the height deviation HDEV multiplied by a coefficient KSH representative of the correlation between a change in speed and a change in height. For example, if a 20% change in speed corresponds to a 30% change in height, the coefficient KSH would be equal to 2 divided by 3 or about 0.67. If the height is 6.5 millimeters and the nominal height HNOM is 5 millimeters, HDEV would be 0.3 and the speed S would be adjusted up 20% by block 52 to try to lower the height by the required 30%. It should be appreciated that the coefficient such as KIH and KSH should be selected to avoid instability in the feedback control loop realized by the arrangement of FIG. 3. Additionally, these coefficients could be calculated to have different values depending upon the present value of the parameter in question and depending upon the values of the other parameters.

Either of blocks 50 and 52 leads to a return block 54 corresponding to the output of block 42 in FIG. 3.

If desired, a test block similar to block 42 could be used before the block 52 in order to insure that any new speed value would be within an acceptable range of speeds. Additionally, the "no" output of block 48 could alternately lead to a block to test a proposed new value for the wire feed rate W to determine if its is within an acceptable range, this block being followed by a block similar to 50 except changing the value to W. It should also be appreciated that the height adjust subroutine of FIG. 4 could adjust the wire feed rate W instead of adjusting the current I. As a decrease in the wire feed rate would be used to correct a height which is too large, the coefficient of the wire feed rate relative to the height (KWH) would be negative. It should be appreciated that the arrangement of FIG. 4 shows how any of the weld parameters may be adjusted to compensate for the height error signal and in such a way as to decrease or minimize the height error signal. More sophisticated height adjustment routines could be used whereby more than one of the weld parameters could be adjusted to try to minimize the height error signal. For example, if the nominal value of the height is 5.0 millimeters and the actual value is 6.5 millimeters, an alternate height adjustment procedure might increase the current I and decrease the wire feed rate W in combination to try to diminish the height error signal.

The arrangement of FIG. 3 provides for the adjustment of the height parameters until the height H of the bead is satisfactory. Once the height H is satisfactory, the block 40 leads to block 56 which tests to determine if the width is satisfactory. This test may be accomplished in similar fashion to the operation of block 40 as discussed above. If the width is unsatisfactory, control is transferred to block 58 which would correspond to a subroutine similar to that of FIG. 4 except that the subroutine would adjust various weld parameters to bring the width closer to a nominal value which could be used as a reference for comparison purposes in block 56 and/or the subroutine of block 58. Various of the width affecting parameters which could be adjusted by block 58 include those parameters discussed above as height parameters. Empirical considerations may dictate that some of the parameters are preferred for adjusting height, whereas other of the parameters are preferred for adjusting width. Alternately, adjustments in width might be best accomplished by adjusting two parameters simultaneously. For example, if the width is too great, it may be helpful to increase the speed S and decrease the wire feed rate W to maintain the height while narrowing the width. A sophisticated width adjustment subroutine corresponding to block 58 would adjust various of the parameters to change the width and minimize any effect on the height of the bead. Such a subroutine would be constructed in accord with the particular type of welding and the empirically determined relationship between the bead width, bead height, and the various welding parameters which affect the bead dimensional variables.

The arrangement of FIG. 3 would provide for the adjustment of the bead height, bead width, and then the transfer of control to block 60 which tests to determine if the cross sectional area of the bead is satisfactory. If the cross sectional area of the bead is too low or too high as determined by a comparison between the area as sensed and a reference value indicative of the desired cross sectional area, block 62 would take control and perform a subroutine similar to that of FIG. 4 in order to adjust several parameters which affect the area may overlap with those which affect the bead height and width. The procedure of block 62 may provide for adjustment of several parameters simultaneously. Additionally, or alternatively, the procedure of block 62 may adjust the area by simply incorporating a height or width adjustment subroutine. For example, if the area is too large, the height is at the high end of its range, and the width is at or very slightly above its nominal value, the area could be adjusted by lowering the height to be closer to the middle of its acceptable range.

The procedure of FIG. 3 provides for the maintaining of the parameters at block 64 if the three dimensional bead variables of height, width, and area are within acceptable ranges.

It should be appreciated that the flow chart of FIG. 3 is relatively simple in providing for bringing the height within its acceptable range before testing the width and then bringing the width within an acceptable range before testing the area. Depending upon the importance of the three dimensional bead variables of height, width, and area and the particular type of bead producing process, the order of adjustments to the three dimensional bead variables could be arranged differently. Further, one could provide for eight different subroutines (instead of the three subroutines of blocks 42, 58, and 62) to provide different procedures corresponding to the eight permutations of the three bead variables height, width, and area. For example, such a more sophisticated program might provide one procedure to be followed if the height was acceptable, but the width and area were both too low, and a different procedure if the width was acceptable, but the height and area were both too low.

The ranges for bead variables may vary depending upon location. For example, the height range could be higher at the location of an incipient undercut such that peak reinforcement is applied for maximum strength at that location.

Returning now to FIG. 2, the calculation module has calculated the values for the weld parameters and supplies the weld parameters to a control means including a robot control 66, a wire feed 68, and a weld torch power supply 70. The robot control 66 controls the robot and weld torch 10 in accord with the calculated values for the weld parameters. If all of the bead variables H, W, and area are within their proper ranges, the weld parameters supplied by the calculation module 34 to the robot control 66 will be maintained constant. If one or more of the bead variables H, W, and the area are not within their proper range, the calculation module 34 will supply modified values of one or more of the weld parameters such that the robot control 66 modifies operation of the robot and torch 10 to correct the bead variable which is outside of its range, the arrangement of FIG. 2 providing a feedback control loop.

As indicated, the robot control 66 may send a speed change signal to the robot to cause the weld torch 10 to change its speed along the seam 12. The use of this speed change in conjunction with the robot control 66 is optional, as changes in other weld parameters such as the wire feed rate W and/or the current I or voltage V could be used (instead of the speed) to adjust the bead variables by the illustrated feedback control system. The wire feed 68 controls the flow of wire to the weld torch 10 if the weld torch 10 is the type of torch which uses wire. By adjusting the rate of wire feed W, one can control or affect the bead variables. In similar fashion, adjustments to the current I or voltage V supplied by the weld torch power supply 70 to the weld torch 10 can be used to adjust the the bead variables.

With reference now to FIGS. 5, 5A, and 6, an alternate embodiment of the present invention will be discussed. For ease of discussion, the parts illustrated in these figures are in the "100" series with the same last two digits as the generally corresponding component illustrated in FIGS. 1 and/or 2. This second embodiment of the present invention uses a sealant or glue gun 110 attached to a support 122 which is movable by movement of the arm 124 under a robotic or other automated operation. The support 122 also provides mounting for a bead profiler 128 which would have a sensing area on its bottom (not visible) at its end nearest the sealant or glue gun 110 such that the profiler 128 provides profile information on a sealant or glue bead 118 immediately after its formation from the sealant or glue gun 110. The bead 118 may be applied to a singel workpece 114 by following a preprogrammed path.

As shown in FIG. 6, the profile data of block 130 is supplied to the processor 132 whereat the height, width, and area of the bead are determined. These three dimensional bead variables of height, width, and area are supplied to a calculation module 134 which determines whether changes are needed in the sealant or glue gun parameters such as pressure P on the sealant or glue, size Z of the sealant of glue gun nozzle orifice, and speed S of the sealant or glue gun 110 along the surface of workpiece 114.

The calculation module 134 may use the procedure illustrated by FIG. 3, it being understood that the subroutines of blocks 42, 58 and 62 would be different so that the feedback control of the height, width, and area of the bead is accomplished by adjusting the pressure P, orifice size Z, and speed of travel S instead of the parameters used for the welding torch. For example, if the bead height is 6.5 millimeters and the acceptable range is within 1 millimeter of the nominal value of 5 millimeters, the height adjustment routine of block 42 could use a procedure similar to that of FIG. 4 except that it would decrease the pressure on the sealant or glue so as to lower the height to within the acceptable range. Alternately, the height could be lowered from its 6.5 millimeter value to an acceptable value by decreasing the size of a nozzle orifice in the sealant or glue gun. As with the discussion above with respect to the procedure followed by the calculation module 34, the procedure followed by calculation module 134 might includes adjustments in several parameters simultaneously and/or simultaneous adjustments to bring more than one of the three bead dimensional variables of height, width, and area to within the proper range. Although the feedback control loops of FIG. 2 and FIG. 6 illustrate feedback control to minimize error signals in the three bead variables height, width, and area (the height error signal is shown explicitly in FIG. 4 whereas the width error signal and area error signal would be calculated in similar fashion), either of these two arrangements could be simplified such that the feedback control is used to adjust only one or only two of the three bead variables. For example, certain kinds of welding might only use the weld bead reinforcement cross sectional area or the bead width, whereas the sealant application arrangement might only use the bead height or the cross sectional area as the variable which is stabilized by feedback control.

The calculated parameters produced by calculation module 134 are supplied to robot control 166 which may change the speed of the robot or automated control arm 124 to increase or decrease the speed of the sealant or glue gun 110 along the surface of the workpiece 114 in accord with the calculated value for the speed S. Additionally, the nozzle orifice size control 168 sets the size of the nozzle orifice for the sealant or glue gun 110 in accord with the value of the size parameter Z. The pressure supply 170 is controlled by the parameter P in order to change the pressure supplied to the sealant or glue gun 110.

The parameters P, Z and S are quite interrelated as are the weld parameters for the embodiment of FIGS. 1 and 2. Accordingly, procedures might be used whereby a change in one parameter will automatically change another parameter. For example, if the height of a sealant bead 118 is too low and one increases the nozzle orifice size, one could simultaneously make adjustments in the pressure supply 170 of FIG. 6 such that the increased orifice size does not result in a lower pressure supplied to the sealant or glue gun.

FIG. 7 shows how the calculation module 34 for the bead geometry (from FIG. 2) may be integrated into a system 200 which uses seam location and width information in block 202, puddle location and size information in block 204, and arc voltage or current information in block 206 for controlling the robot motion control 66, wire feed control 68, and welding power supply voltage or current in block 70. In particular, the system 200 uses the sensor information of blocks 202, 204, and 206 to control the various functions corresponding to the right side blocks of FIG. 7 in accord with the control lines extending between the blocks. For example, the sensed information on the seam location and the width is used to control the robot motion control 66 and the wire feed control 68. If the width of the seam increases, the system 200 might provide for an increase in the wire feed rate as controlled by wire feed control 68. The block 204 corresponds to sensing of the puddle location and size and could be used for controlling the motion control 66 and the welding power supply 80 to provide feedback control of the puddle location and size. Changes in the arc voltage or current as sensed in block 206 might be used to adjust the robot motion control of block 66 or the arc voltage in block 70. By adding the bead geometry calculation module 34 to the arrangement of system 200, one can affect each of the right side control functions of blocks 66, 68, and 70 afor feedback control of the bead geometry. This feedback control of bead geometry in accord with the present invention could be integrated into the system 200 in a number of different ways. For example, if the seam location and width block 202 indicated that the width of the seam was diminished by 10%, the block 202 could order a reduction in the wire feed control rate supplied by block 68, which reduction could be combined with any adjustment in the wire feed control rate ordered by the bead geometry calculation module 34. If the block 202 ordered a 10% reduction in the wire feed control rate and module 34 ordered a 5% increase in the wire feed cotnrol rate, the wire feed control block 68 could superimpose these rate changes and generate a 5% reduction in the wire feed control rate.

FIG. 8 shows a block diagram illustrating how the bead geometry calculation module 134 of FIG. 6 may be combined with a system 300 which uses track location information sensed in block 302 and sealant or glue supply variable information sensed in block 304 for controlling the robot motion control 166 and the sealant supply control 306. (The sealant or glue supply control 306 may combine control of a sealant or glue gun nozzle orifice and control of a sealant or glue pressure supply.) In similar fashion to the relationship between calculation module 34 and system 200 of FIG. 7, the calculation module 134 for the sealant or glue gun may provide feedback control of the bead geometry which can be superimposed with feedback control of the track location and the sealant supply variables such that changes in parameters from the sensed information of the left side blocks of FIG. 8 may be superimposed with any changes in parameter values dictated by the calculation module 134.

Although various specific constructions have been discussed herein, it is to be understood that these are for illustrative purposes only. Various modifications and adaptations will be readily apparent to those of skill in the art. Accordingly, the scope of the present invention should be determined by reference to the claims appended hereto.

What is claimed is:

1. A method of automatically controlling a bead producing process in real time comprising the steps of:
producing a bead by moving a bead producing tool along the surface of one or more workpieces;
generating dimensional profile information on said bead immediately after its formation with an optical profiler that tracks said bead;
deriving from said profile information bead variables which are the height and width and cross sectional area of said bead above the workpiece level;
comparing said bead variables to respective reference values and determining which are unsatisfactory;
calculating process parameters that affect at least first and second unsatisfactory bead variables and compensate for any deviation; and
controlling said bead producing tool for feedback control of said first and second bead variables.

2. The method of claim 1 wherein said bead producing tool is a welding torch and said process parameters are selected from the group of welding torch voltage, welding torch current, speed of travel of said torch, and wire feed rate to said torch.

3. The method of claim 1 wherein said bead producing tool is a sealant gun and said process parameters are selected from the group of sealant pressure, nozzle orifice size, and speed of travel of said sealant gun.

4. The method of claim 1 wherein said bead producing tool is a glue gun and said process parameters are selected from the group of glue pressure, nozzle orifice size, and speed of travel of said glue gun.

5. The system for controlling bead production comprising:
   a bead producing tool operable to produce a bead upon one or more workpieces;
   an optical profiler to track said bead immediately after said bead producing tool and generate bead profile data;
   means for processing said profile data and deriving bead variables which are the height and width and cross sectional area of said bead above the workpiece level;
   calculation means for comparing said bead variables to respective reference values and determining which are unsatisfactory, and for calculating system parameters that affect at least a first unsatisfactory bead variable and compensate for any deviation; and
   control means responsive to said calculation means and operable to control said bead producing tool for feedback control of said first bead variable.

6. The system of claim 5 wherein said bead producing tool is a welding torch and said control means is operable to change at least one system parameter which is selected from the group of welding torch voltage, welding torch current, speed of travel of said torch, and wire feed rate to said torch.

7. The system of claim 5 wherein said bead producing tool is a sealant gun and said control means is operable to change at least one system parameter which is selected from the group of sealant pressure, nozzle orifice size, and speed of travel of said sealant gun.

8. The system of claim 5 wherein said bead producing tool is a glue gun and said control means is operable to change at least one system paraemter which is selected from the group of glue pressure, nozzle orifice size and speed of travel of said glue gun.

* * * * *